United States Patent
Monakhov et al.

(10) Patent No.: US 10,949,289 B1
(45) Date of Patent: Mar. 16, 2021

(54) SYSTEM AND METHOD FOR MAINTAINING DATA INTEGRITY OF DATA ON A STORAGE DEVICE

(71) Applicant: Virtuozzo International GmbH, Schaffhausen (CH)

(72) Inventors: Dmitry Monakhov, Moscow (RU); Alexey Kobets, Seattle, WA (US); Pavel Emelyanov, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 32 days.

(21) Appl. No.: 16/235,330

(22) Filed: Dec. 28, 2018

(51) Int. Cl.
*G06F 11/10* (2006.01)
*G06F 3/06* (2006.01)

(52) U.S. Cl.
CPC .......... *G06F 11/1004* (2013.01); *G06F 3/064* (2013.01); *G06F 3/0619* (2013.01); *G06F 3/0673* (2013.01); *G06F 11/1048* (2013.01); *G06F 11/1064* (2013.01)

(58) Field of Classification Search
CPC .... G06F 11/1004; G06F 3/0619; G06F 3/064; G06F 3/0673; G06F 11/1064
See application file for complete search history.

(56) References Cited

U.S. PATENT DOCUMENTS

| | | | | |
|---|---|---|---|---|
| 4,991,079 A * | 2/1991 | Dann | ..................... | G06F 15/161 709/201 |
| 7,363,498 B2 * | 4/2008 | Hennessey | ........ | H04L 29/12113 713/176 |
| 2003/0131280 A1 * | 7/2003 | Gittins | ................... | G11B 20/18 714/6.13 |
| 2005/0071660 A1 * | 3/2005 | Shimizu | ................ | G06F 21/121 713/193 |
| 2005/0165995 A1 * | 7/2005 | Gemelli | .................. | G06F 30/30 710/305 |
| 2007/0192580 A1 * | 8/2007 | Challener | ............. | G06F 21/575 713/2 |
| 2015/0288523 A1 * | 10/2015 | Burghardt | ............. | H04L 9/3268 726/20 |
| 2016/0342462 A1 * | 11/2016 | Karamanolis | ......... | G06F 3/0619 |
| 2018/0300152 A1 * | 10/2018 | Gschwind | ........... | G06F 9/3863 |

* cited by examiner

*Primary Examiner* — Guy J Lamarre

(74) *Attorney, Agent, or Firm* — Arent Fox LLP; Michael Fainberg

(57) ABSTRACT

Systems and methods are disclosed herein for maintaining data integrity of data in a storage device. An exemplary method comprises determining whether checksums associated with data on the storage device are trusted or untrusted, responsive to determining that the checksums are trusted, retrieving the checksums from a checksum archive, otherwise initializing the checksums as unknown, when a received storage request is a write request, calculating a checksum of the data and updating the checksum in memory, when a received storage request is a read request and an in-memory checksum associated with the identified block is not unknown, calculating the checksum of the data in the identified block and comparing the checksum with an in-memory checksum associated with the identified block, determining that corruption has occurred when the checksums don't match and saving checksums associated with each of the uncorrupted data blocks of the storage device to an archive.

20 Claims, 8 Drawing Sheets

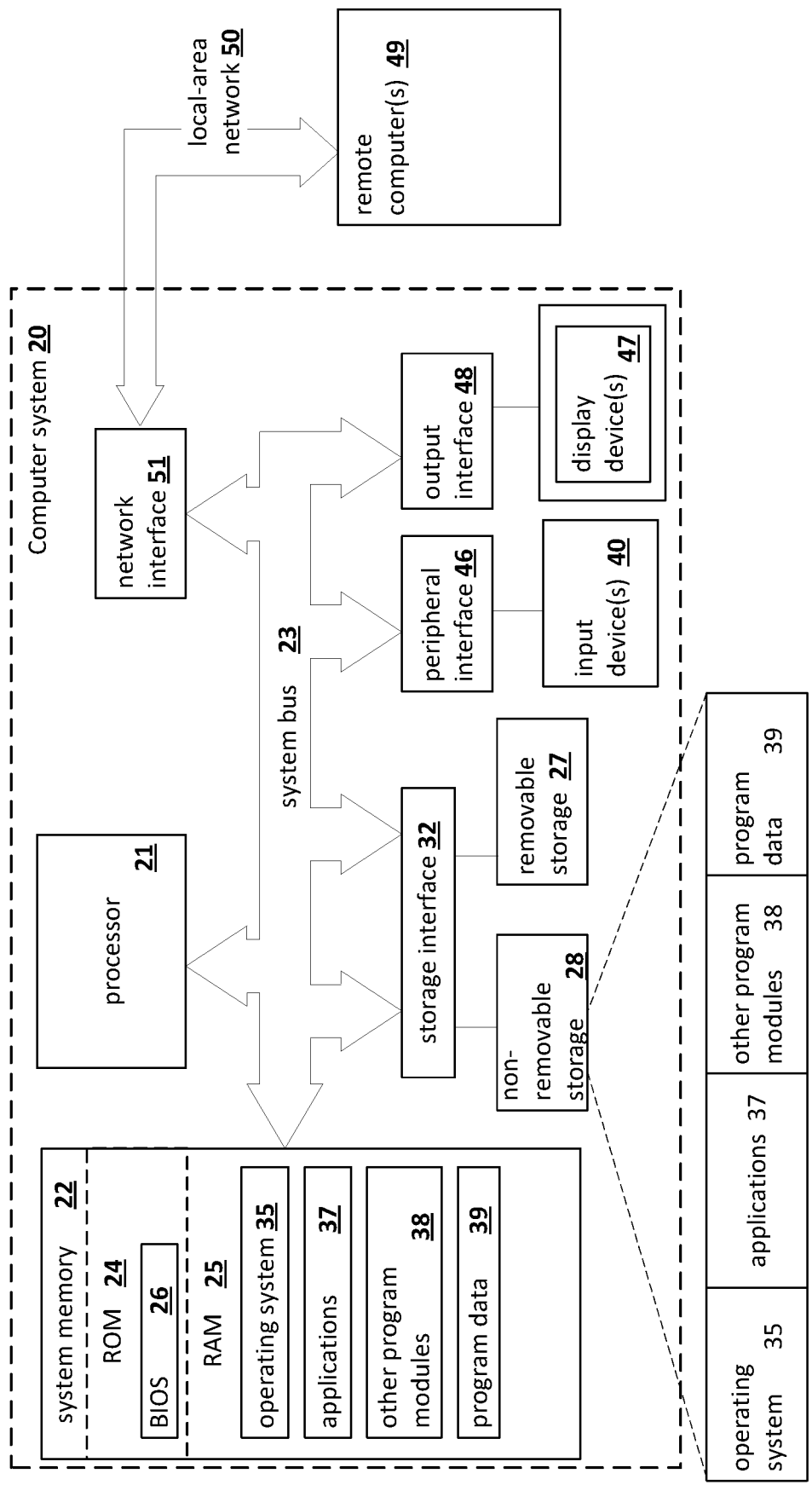

SYSTEM AND METHOD FOR MAINTAINING DATA INTEGRITY OF DATA ON A STORAGE DEVICE

FIELD OF TECHNOLOGY

The present disclosure relates generally to the field of data integrity and consistency, and more specifically, to systems and methods for maintaining data integrity of data on a storage device.

BACKGROUND

Conventional block devices generally do not support the calculation and storage of checksums. Some standards, such as the SCSI T10 standard device, has a field called the Data Integrity Field (DIF) that regulates disk handling, including the idea of physically extending each data block by 4 or 8 additional bytes to store data checksums. According to the standard, placing 0xFF (all1s) in the checksum sector indicates that this checksum is invalid (i.e., the checksum field should not be trusted). However, disks with checksum support are generally enterprise-grade and often prohibitively expensive for some businesses and consumers.

Some hybrid solutions have been proposed where checksums for a disk are stored on a separate device. However, data coherence is a major concern for these implementations. When data is being written to these disks, the checksums are calculated and stored, but in the event of a failure or power outage, a checksum may be left unsaved. These unsaved checksums give the appearance that corrupted data is written to the disk, while the data may actually be uncorrupted. That is, a false positive is presented where undamaged data is falsely assumed to be corrupted.

Another concern for such hybrid solutions is that when storing the data in one place and the corresponding checksums in another place and updating them coherently, the disk head moves constantly and thus may significantly reduce performance of the disk and the system.

SUMMARY

The present disclosure provides an effective solution for the foregoing problems of conventional techniques associated with maintaining data integrity on devices that do not support the use of checksums. Disclosed are example systems, methods and computer program products for maintaining data integrity for data on storage devices.

In an exemplary aspect, a disclosed method comprises determining whether checksums associated with data on the storage device mounted on a computer system are trusted or untrusted, responsive to determining that the checksums are trusted, retrieving the checksums from a checksum archive, otherwise initializing the checksums as unknown, receiving a storage request for an identified block of the storage device, when the storage request is a write request, calculating a checksum of the data and updating the checksum in memory of the computer system, when the storage request is a read request and an in-memory checksum associated with the identified block is not unknown, calculating the checksum of the data in the identified block and comparing the checksum with an in-memory checksum associated with the identified block, determining that a data corruption has occurred when the checksum does not match the in-memory checksum and saving checksums associated with each of the uncorrupted data blocks of the storage device to the checksum archive.

In another aspect, the method further comprises wherein determining whether the checksums are trusted or untrusted comprises determining that the storage device was not turned off correctly, detecting that there are checksums that are not trusted associated with blocks in the storage device and setting the untrusted checksums as unknown.

In another aspect, the method further comprises calculating checksums for all blocks of the storage device using a background process for those checksums that are set as unknown.

In another aspect, the method further comprises managing a bitmap containing a status for each block of the storage device and marking a status of a block as dirty if data stored in the block is changed during operation of the computer system and calculating checksums for blocks with a dirty status and storing the calculated checksums in memory of the computer system.

In another aspect, the method further comprises when the storage request is a write request, calculating the checksum of the data asynchronously, after the data is written to the block of the storage device, saving the checksums to the checksum archive upon receiving an unmount request to unmount the storage device from the computer system.

In another aspect, the method further comprises storing the checksum in memory using write-through caching mode.

In another aspect, the checksum archive is one of a separate block device, a portion of the storage device, a portion of the storage device with a file system stored thereon with indexing, or a local or remote key-value store with non-indexed search, wherein indexing refers to storing checksums in a linear array and finding the checksums for a corresponding block using a block number of the block.

In another aspect, the method further comprises searching the local or remote key-value store using a non-indexed search comprising one of radix tree or hash table.

According to another exemplary aspect, a system is provided comprising a hardware processor configured to perform any of the methods disclosed herein.

According to another exemplary aspect, a computer-readable medium is provided comprising instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 8 is a block diagram of a computer system on which the disclosed system and method can be implemented according to an exemplary aspect.

DETAILED DESCRIPTION

Exemplary aspects are described herein in the context of a system, method, and computer program product for maintaining data integrity of data on a storage device. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
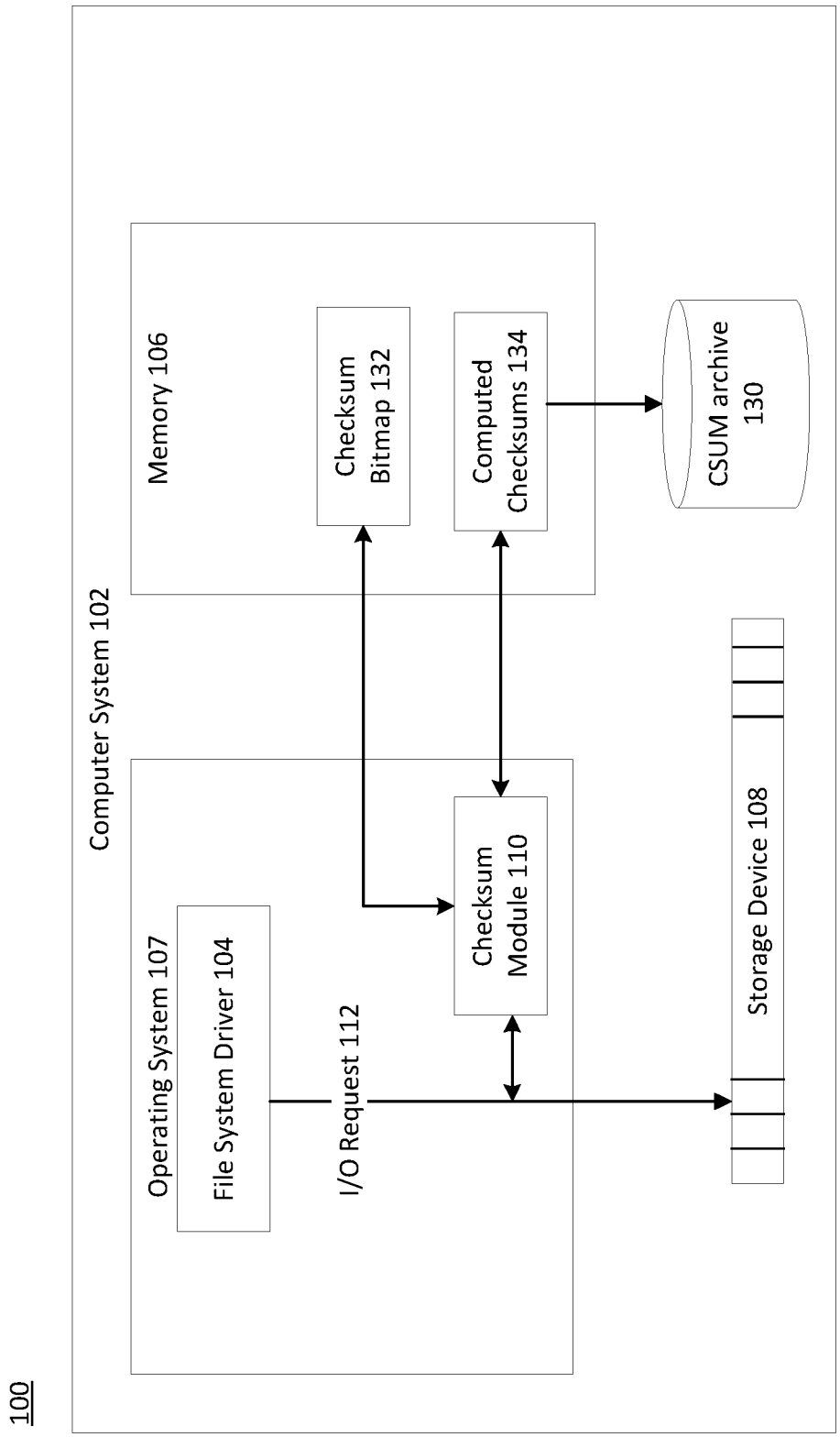
FIG. 1 is a block diagram of a system for maintaining data integrity of data in a storage device, in accordance with exemplary aspects of the present disclosure.

FIG. 1 is a block diagram of a system 100 for maintaining data integrity of data in a storage device, in accordance with exemplary aspects of the present disclosure.

According to exemplary aspects, the system 100 for maintaining data integrity of data in a storage device comprises a computer 102 comprising memory 106, operating system 107, a storage device 108 and a checksum archive 130. In exemplary aspects, the storage device 108 (alternatively referred to as disk, block device and/or data storage device) may be any kind of physical storage device (e.g., a HHD, SSD, SMR, flash drive, etc.) and may be located on computer system 102, as shown in FIG. 1. In other aspects, the storage device 108 may be a portion of memory 106, a storage device of another computing device, or a network storage device. In some aspects, the storage device 108 may be a conventional block device. In some aspects, the storage device 108 may not support storing checksum data, as is found in other storage devices, e.g., SCSI devices following the T10 standard, while in other aspects, storage device 108 does support checksum storage. The system 100 may be applied to any type of block device, for example a virtual block device or a block device that supports the use of checksums. In other words, the storage device 108 may be any type of block device such as a virtual or physical devices.

In exemplary aspects, the checksum archive 130 is one of a dedicated disk, a partition on storage device 108, can be available via network (e.g., located on another computer), data block device with a file system on it or a specifically created file (e.g., pre-allocated space in a file or metadata extension) on the storage device 108. In some aspects, checksums in the archive 130 can be addressed by indexing them with a block number. In further aspects, the checksum archive 130 may also be one of a local or remote key-value store (e.g., on a dedicated disk, partition, or file on disk) wherein search is performed by using one or more of: a radix tree, a hash table or another data structure. Indexing refers to keeping the checksums in a linear array and finding the checksum for a corresponding block using the block number (the offset within the original block device) as an array index. Though in FIG. 1, the checksum archive 130 is shown as part of the computer system 102, the checksum archive 130 may be a separate disk, another portion of disk 108, a portion of memory, a part of a different computer, or available via a network. Other configurations are also contemplated herein.

The operating system 107 comprises, in part, file system driver 104 and checksum module 110. The checksum module 110 calculates checksums 134 for data on the storage device 108 and stores the checksums 134 into the checksum (CSUM) archive 130. In system 100, the CSUM module 110 and file system driver 104 may be components of the operating system 107. In other aspects, the CSUM module 110 and the file system driver 104 may be controlled by the operating system 107. In some aspects, CSUM module 110 may be software, (e.g. a driver, daemon, process etc.) that is executed on the CPU of the computer system 102 and whose code/instructions are in memory 106. In some aspects, the file system driver 104 is a driver of a file system stored on/mounted above storage device 108. It is noted that, the file system driver 104 is an example of a component sending I/O requests to the storage device 108 (i.e., it is optional in some aspects). Other examples can be operating system 107, applications, drivers, daemons, processes, etc. In some aspects, there can be a plurality of such components.

In exemplary aspects, the checksum module 110 intercepts, or receives, or is notified about I/O requests (e.g., I/O request 112) from file system driver 104 (or any other component) to write or read data to device 108. In exemplary aspects, I/O requests to write or read data to device is also referred to as storage requests. The checksum module 110 also intercepts I/O requests from an operating system of the computer system 102, an application, a client, or the like. In some aspects, the checksum module 110 detects each read or write request sent to storage device 108.

In some aspects, the checksums 134 are calculated and stored by the checksum module 110 when the checksum module 110 intercepts a request. In some aspects, the checksum module 110 may react to requests (e.g., 112) synchronously and, in other aspects, asynchronously. In the case of an asynchronous reaction, CSUM module 110 does not lock requests. In this aspect, upon receiving or intercepting a request to storage device 108, the CSUM module 110 identifies blocks of storage device 108 whose CSUMs should be recomputed. In some aspects, the checksum module 110 may defer the computation and/or storage of these CSUMS, even after the request to the storage device 108 is fulfilled.

In some aspects, the system 100 also includes the set of computed checksums 134 in memory 106 and a checksum bitmap 132 in memory 106 that shows which blocks have been changed after their corresponding CSUMs have been written to the CSUM archive 120. For those blocks whose corresponding checksums have not been written to the archive 130, the checksum bitmap 132 maps one or more bits to each block of the storage device 108. The checksum bitmap 132 keeps track of which blocks (and their corresponding checksums) have been altered, or are "dirty".

Thus, on a write request for a particular block, the checksum module 110 marks (e.g., sets) a corresponding bit (or bits) in the checksum bitmap 132 as dirty. When a checksum of the computed checksums 134 is stored to the checksum archive 130, the corresponding bit in checksum bitmap 132 will be reset. In some exemplary aspects, the checksum bitmap 132 may be a list of which blocks have changed. The system 100 may alternatively use any other data structures, or a combination of data structures, that can track/mark CSUMs to be changed.

The checksum module 110 controls the calculation and storing of checksums to the CSUM archive 130. In some aspects, the storage of the checksums is performed according to a predetermined schedule set by an administrator of system 100. In some aspects, write-through caching mode may be used to save the checksums to disk or archive. Generally, the checksums in memory only take a small portion of space, in some examples such as sha1/md5, only a few bytes. Typically, minimal disk I/O size is 512 bytes, but many modern file systems may utilize larger blocks making I/O blocks effectively become 2 k or 4 k bytes. Writing each and every checksum piece to disk becomes a very expensive operation, as writing several bytes takes the same time as writing an I/O block. Thus, in some aspects writing the checksum may be performed rarely, when the disk is unused, in large chunks, or when the storage device is being unmounted. In some aspects, "rarely" refers to storing after predetermined amount of time, storing after a predetermined number of checksums are collected for storage, or any type of "lazy" mode. Alternatively, writing of the checksum can be a) grouped and/or b) delayed, by the checksum module 110. In some aspects, once a predetermined number of checksums are ready for writing, the checksum module 110 places them all in one I/O request to store in the checksum archive 130 and serves the request. This improves performance (mainly IO latency) greatly.

In exemplary aspects, the system 100 may receive an I/O (e.g., read) request for a block whose checksum is set to "unknown". In this scenario, the checksum module 110 writes the computed checksum for the block into the checksums structure 134 (e.g., instead of sending an error to the file system driver 104 or other caller).

In some exemplary aspects of the present disclosure, the checksum module 110 stores checksums 134 in memory 106 of the computer system 102. Making a coherent update of data and of checksums is not convenient, because data and their checksum are stored in different places on the disk and this reduces performance of the disk. In this aspect, calculated checksum 134, bitmap 132 and checksum archive 130 allow for a lazy update of checksums in the archive 130. In some aspects, the system 100 uses computed checksums 134 as cache for the checksums in the checksum archive 130. In this aspect, storing checksums 134 in the checksum archive 130 is considered equivalent to writing cache to disk. There are two ways of implementing the writing of cache in the present disclosure, though other methods are also contemplated. Write-back refers to an implementation where the system 100 stores checksums 134 in "lazy" mode, discussed above with respect to FIG. 1. Write-through refers to the implementation where the system 100 writes checksums 134 to the checksum archive 130 immediately. In some aspects, checksums 134 are called ephemeral checksums, and may be stored in memory of the system 100, or on a block device (e.g. SSD disk or a virtual block device).

In one exemplary aspect, the system 100 may be applied to block devices with large cluster sizes. Generally a cluster comprises a large portion of data, for example from 4 MB to 128 MB. In the example of 128 MB data clusters, the checksum bitmap 132 stores a dirty bit for every cluster, e.g., one dirty bit for every 128 MB. It is not convenient to use a bit in bitmap for each block in case of large clusters, so one bit in a bitmap is used for each cluster. In this exemplary aspect, one bit in the bitmap corresponds to several blocks (e.g., those blocks within a cluster). If the checksum module 110 detects a write request to any block in the cluster, the checksum module 110 sets the dirty bit for the entire cluster, instead of writing one bit per block which would result in a bitmap that is undesirably large.

Figure 2:
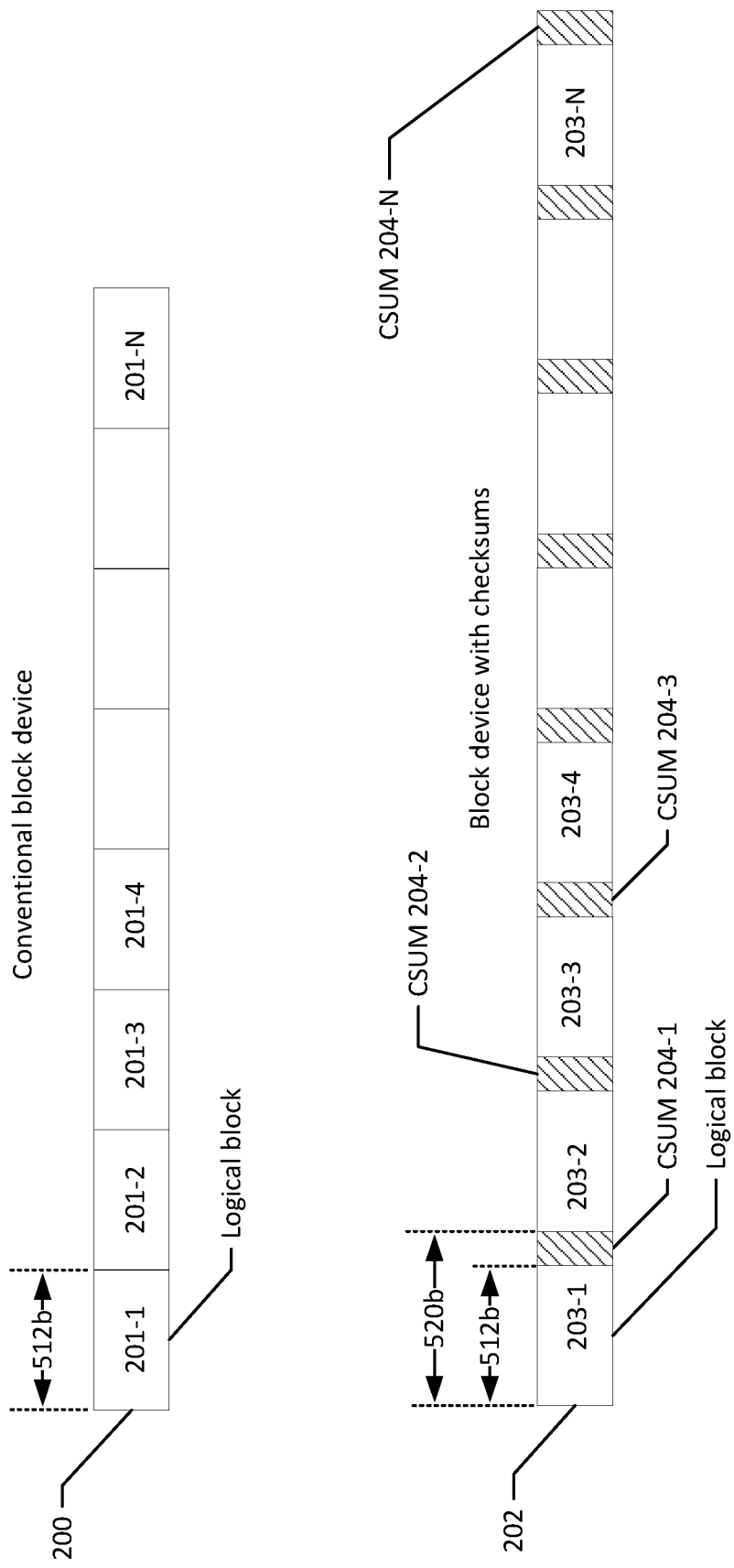
FIG. 2 is a block diagram illustrating conventional hardware solutions.

FIG. 2 illustrates different existing hardware solutions. A conventional block device 200, as shown in FIG. 2, comprises a plurality of logical blocks 201-1, 201-2, 201-3, 201-4 to 201-N. Each logical block stores data and may, in one aspect, be 512 bytes in length, though other sizes are also contemplated. Such disks conventionally do not support checksum usage for each logical block. In contrast to block device 200, block device 202 supports checksums (e.g., T10 checksums). Block device 202 comprises a plurality of logical blocks 203-1, 203-2, 203-3, 204-4 to 203-N that are, for example, 512 bytes in length. Further, an additional number of bytes are used at the end of each logical block 203-1 to 203-N to store a corresponding checksum 204-1 to 204-N. In this example, each checksum uses eight bytes and may be represented as two hex characters (e.g., "0xFF, or the like), though other checksum sizes are possible. Thus the total size of a block with a checksum is 520 bytes for device 202, resulting in such checksum enabled devices being significantly more expensive than conventional storage devices such as device 200.

Figure 3:
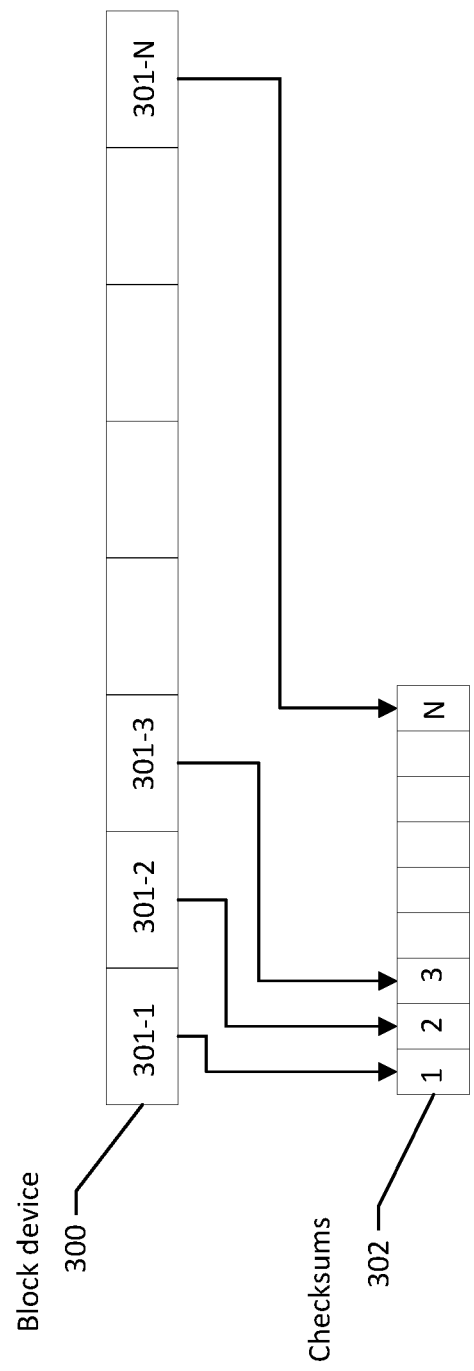
FIG. 3 is a block diagram illustrating a conventional block device and a collection of corresponding checksums, in accordance with exemplary aspects of the present disclosure.

FIG. 3 is a block diagram illustrating ephemeral checksumming for block devices, in accordance with exemplary aspects of the present disclosure.

Block device 300 comprises a plurality of logical blocks 301-1 to 301-N for storing data. Each of these logical blocks 301-1 to 301-N have a corresponding checksum 302-1 to 302-N, collectively referred to as checksums 302 or checksum archive 302.

In exemplary aspects of the disclosure, the checksums 302 can be stored on block device 300 near their corresponding logical block. In alternative aspects, the checksums 302 may be stored in memory 401 (e.g., memory of computer system 102) and/or on another disk. This allows maintaining and using checksums for logical blocks for conventional disks, without the added expense found in devices that support check-summing, e.g. SCSI T10 devices. In some aspects, the checksums may be stored on a block device, though they can be written to the block device in lazy mode. As described above, checksums are computed and stored in memory as checksums 134 until the checksum module 110 writes them to storage, for example, checksum archive 130. In such cases, the checksum bitmap 132 is used to maintain consistency of CSUMs 134.

Figure 4:
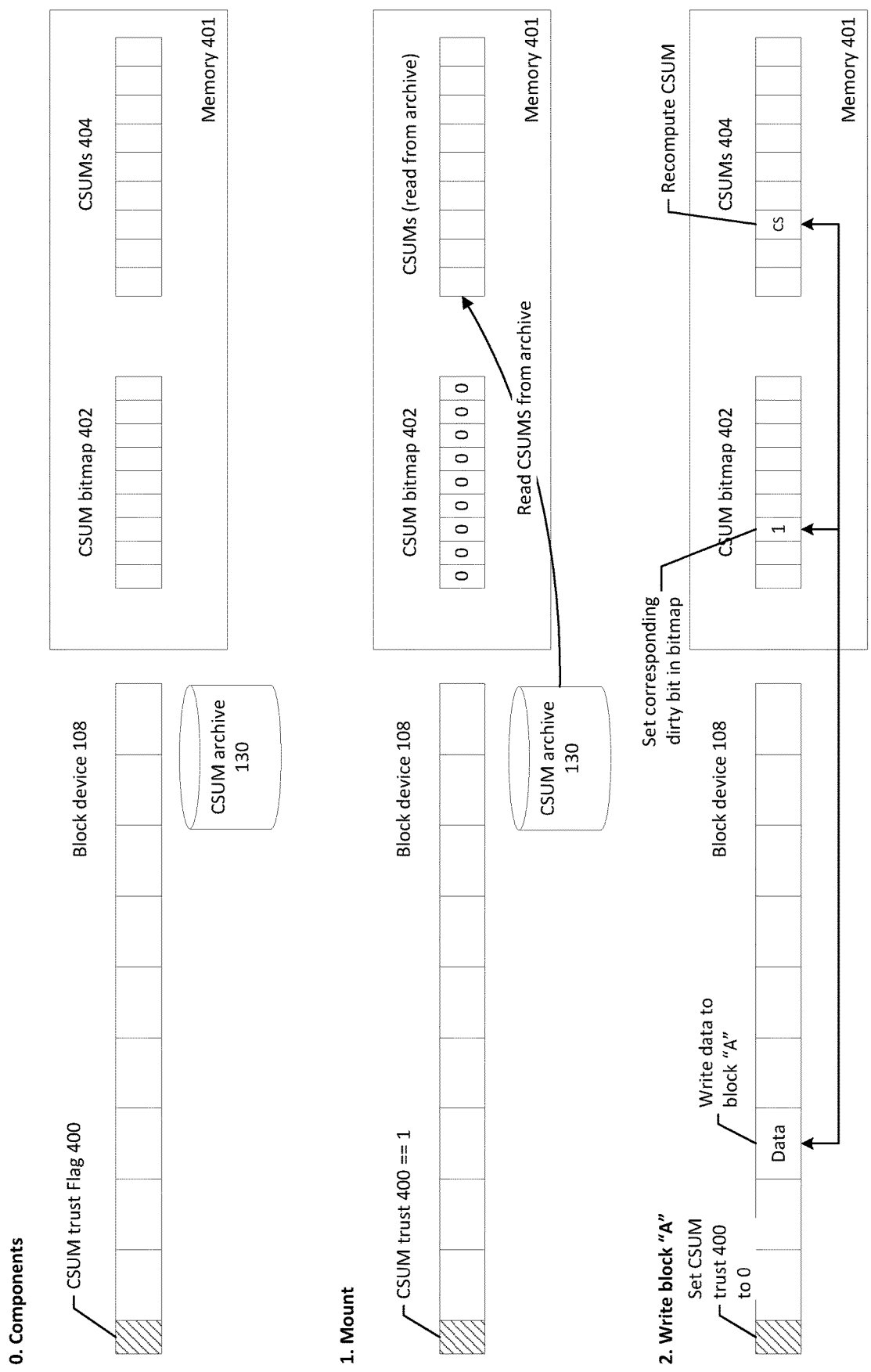
FIG. 4 illustrates a first portion of implementation of checksums in memory for block devices, in accordance with exemplary aspects of the present disclosure.
Figure 5:
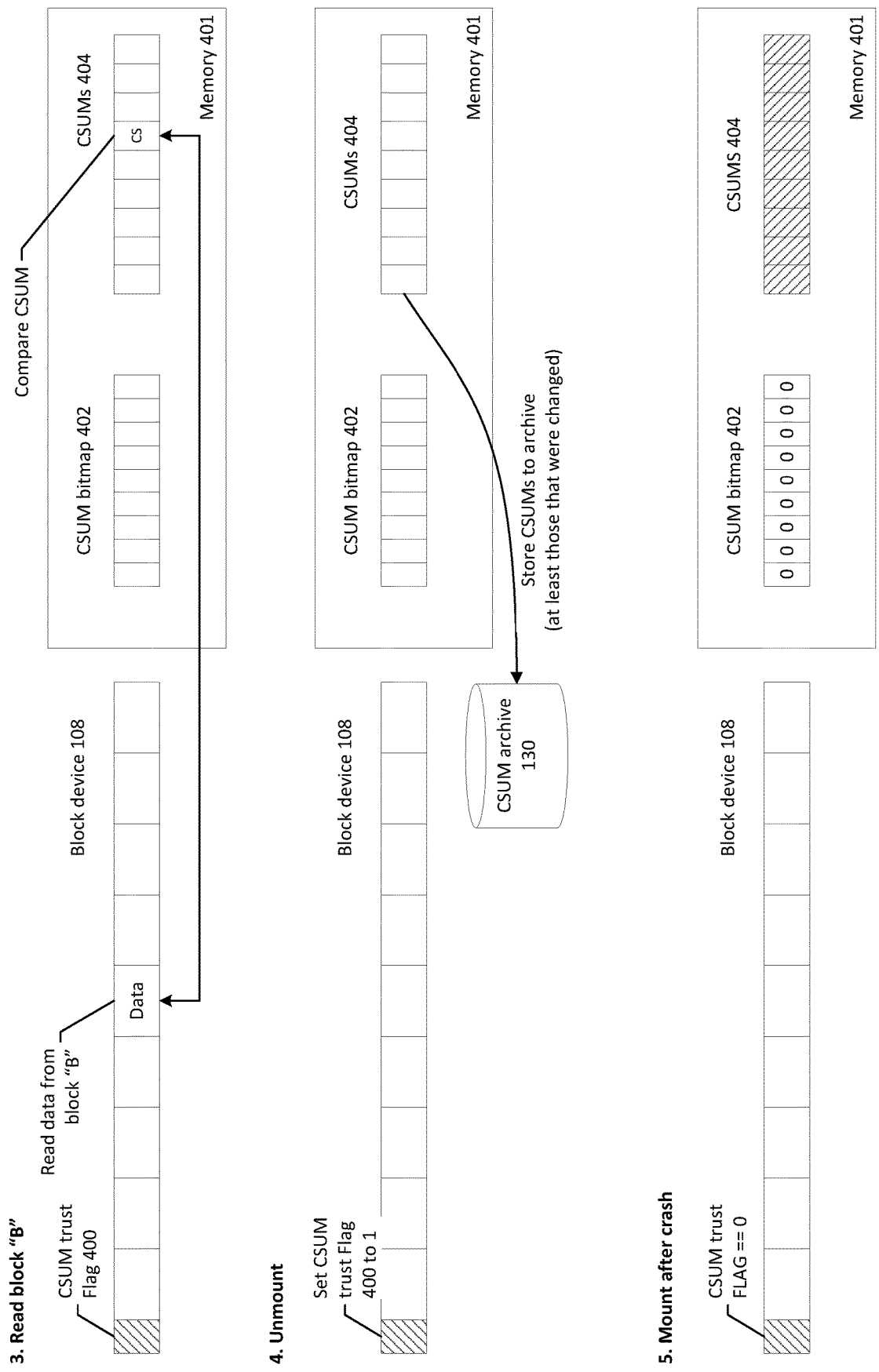
FIG. 5 illustrates a second portion of implementation of checksums in memory for block devices, in accordance with exemplary aspects of the present disclosure.

However, in case of a crash (e.g., power failure to computer system 102, kernel panic of operating system 107, or the like) checksums 302 can be corrupted or not written to the checksum archive 130. For example, if, at the moment of power off, data is already written to logical blocks 301-1 to 301-N on disk 300, but the corresponding checksums 302 are not yet computed and written to checksums storage (e.g., checksum archive 130), then the checksums will be lost. In this scenario, the checksums that are found in checksums storage will not correspond to the data stored in the blocks. In other words, the checksums will be incorrect. FIGS. 4 and 5 describe an exemplary aspect of the disclosure for addressing this issue. In exemplary aspects, checksums that are incorrect are set to a value representing an "unknown" checksum. In one example, the value for an unknown checksum is set to "0xFF" (used in the T10 standard), or the like, though other values are also contemplated by the present disclosure. As a result such software implemented checksumming will correspond to the standard (e.g., T10 standard).

FIG. 4 illustrates a first portion of implementation of checksums in memory for conventional block devices, in accordance with exemplary aspects of the present disclosure.

Various states from 0 to 3 are depicted in FIG. 4. In an exemplary aspect, the components of the system are shown in state 0: the block device 108 that comprises a plurality of logical blocks, a checksum trust flag 400 for a file system, and checksum archive 130. The checksum trust flag 400 indicates whether checksums stored in the checksum archive 130 are coherent, or can be relied upon. The components also include a checksum bitmap 402 (also referred to as a dirty bitmap) and a set of checksums 404 stored in memory 401, e.g., memory of computer 102 shown in FIG. 1. The checksum bitmap 402 contains a record corresponding to each data block in the block device 108. The bitmap value for a particular block will be set to "1" (or some other value indicating a changed block) if data in the corresponding block has been changed. Otherwise, the value is set to "0" (or some other value indicating an unchanged block) if data in the corresponding block has not been changed since a corresponding checksum has been saved to the archive 130. Advantages to using the checksum bitmap 402 include: having mask that shows which blocks of the disk have been changed (e.g., changed since they were written to CSUM archive), or in other words, which checksums have been changed, because if data in the block has been changed, then the corresponding checksum must also be changed.

In other exemplary aspects of the disclosure, the bitmap 402 and checksums 404 may be stored together in one place or stored in different places: in memory 401, on disk, on different disks or on the same block device 108 with the data, elsewhere in a network, or the like. In the illustrated example in FIG. 4, bitmaps and checksums are stored in memory 401 computer 102 while the system 100 is working with the block device 108, but the checksums 404 are stored in the checksum archive 130 when the block device 108 is not used.

Stage "1" indicates the stage when a file system or block device is mounted by an operating system, e.g., operating system 107 at the request of a user, for example. If during the mount of the file system, the checksum module 110 determines that the checksum trust flag 400 is set to a special value (e.g., is equal to "1"), the checksum module 110 determines that the checksums are correct and trusted, and the checksums can be used (such value below will be called "trusted"). In this case, the checksum module 110 retrieves the checksums from CSUM archive 130 where they are stored when the file system driver 104 is not mounted. The checksum archive 130 may be stored on the same block device 108 as the data, on another disk, on distributed storage, in network storage, in a particular location on the file system being mounted, or the like. Accordingly, the initialization step comprises: the checksum module 110 reading the checksums from the checksum archive 130 to memory of the computer 102, and the checksum module 110 initializing the checksum bitmap 402 to zeroes. As described above, the bitmap being set to zeroes indicates that there are no changes in data blocks.

In stage "2", the checksum module 110 determines that a storage request (e.g., storage request 112) is a write request. When the user requests writing data to block "A", block "A" stores the data and the checksum module 110 marks a portion (e.g., a bit) in the checksum bitmap 402 as "dirty" (e.g., sets to "1"), the portion corresponding to the data block "A". Furthermore, the checksum module 110 re-computes the checksum corresponding to data block "A" and saves the recomputed checksum in the set of checksums 404 (e.g., in memory, on disk 108, on another disk, in distributed storage, or the like). In some aspects, the checksum module 110 may re-compute the checksum synchronously with the setting off the checksum bitmap 402, or asynchronously in lazy mode, depending on a configuration of system 100.

During this writing stage, data is written to the block device 108 so the data will not be lost if computer 102 crashes. However, since the checksum bitmap 402 and checksums 404 are stored in memory, in some aspects, they may be lost if the computer 102 crashes.

In some aspects, upon the first write request CSUM module sets the checksum trust flag 400 to a value (e.g., zero, or another value) that indicates that the checksums in the checksum archive 130 cannot be trusted. In some aspects, the checksum trust flag 400 can be changed prior to writing data to the block device 108. In other aspects, the flag 400 can be set during the mount stage "0". In this aspect, the file system is already mounted and can be written to, thus any block can be changed. Therefore, in this aspect, previously stored checksums in the checksum archive 130 cannot be trusted. However, those checksums that have been re-computed for changed blocks are still correct, thus those checksums in memory can still be trusted. These checksums 404 in memory 401 may be used, for example, for read operations. If the system 100 fails, then checksums in memory will not be stored in the checksum archive, and therefore the checksums in the archive will not be trusted. Thus, in some aspects, when the checksum bitmap has no "dirty" bits, the trust flag may be set to "trusted", and otherwise to "un-trusted". In other aspects, the trust flag may be set to "un-trusted" upon mounting of a block device, and may be set to "trusted" on un-mount when all CSUMs from memory are already written to a CSUM archive. It is noted that, in some aspects, CSUM module may determining whether checksums in a checksum archive associated with data on the storage device mounted on a computer system (e.g., 108) are trusted or un-trusted by checking a trust flag. The trust flag may be stored on a file system mounted on the storage device (e.g., if a file system has its own "dirty" bit, then this file system "dirty" bit may be used as a trust flag; or the trust flag may be kept among file system superblock flags; or the trust bit may be stored among file system metadata); on a block of the storage device (e.g., in a predefined place on 108); on the checksum archive (e.g., on CSUM archive header).

FIG. 5 illustrates a second portion of implementation of checksums in memory for block devices, in accordance with exemplary aspects of the present disclosure.

In stage "3", a storage request is received to read data block "B" from the block device 108. Block B is then read from the block device 108. The checksum module 110 computes the checksum of the data in the block and then compares the computed checksum to the corresponding checksum in checksums 404 in memory 401. These two checksums should ideally be equal and if they are not equal, then the checksum module 110 concludes that the data in block B has been corrupted, due to a computer crash, power outage or the like. In this aspect, the checksum bitmap 402 may be unused. However, in other aspects, the checksum module 110 compares a computed checksum with the corresponding checksum in checksum archive 130 if the corresponding bit in checksum bitmap 402 is set to "zero" or another value indicating the corresponding data block is unchanged.

The operating system (e.g., operating system 107) may receive a command to unmount the disk, e.g. the block device 108, at stage 4. At this point, checksums of all blocks in block device 108 marked in the checksum bitmap 402 as being changed, are saved from checksums 404 to the checksum archive 130. Once all data that was changed is stored on the block device 108 and all corresponding checksums have been saved to the checksum archive 130 (e.g., when the data and checksums in archive 130 are consistent), the checksum trust flag 400 is set to "trusted" (e.g., "1" in some aspects). The operating system 107 then unmounts the disk.

In some instances, at stage "5", a request may be received to mount the storage device 108 after computer 102 may have crashed, a power outage may have occurred, an emergency shutdown may have taken place or some other unforeseen event may have occurred that causes concern over the consistency of data stored in the storage device 108. If not all checksums corresponding to the changed blocks were saved to stable storage (e.g., the checksum archive 130), then the checksums in archive 130 and the data on the block device 108 are inconsistent. At least one checksum in the archive 130 differs from a checksum computed based on data in the corresponding block. Thus, the checksums from checksum archive 130 cannot be trusted. In such cases, the checksum trust flag 400 will be set to "untrusted" (e.g., zero in some aspects).

Accordingly, when the mount command is received by an operating system, e.g., operating system 107, the checksum module 110 checks the checksum trust flag 400 to determine whether and which checksums are coherent. If the flag 400 is determined to have a value of "untrusted" (e.g., zero), then the checksums in archive 130 are considered incorrect and are not read. Instead, the checksum module 110 sets all checksums 404 to invalid/unknown (e.g., "0xFF" in the T10 standard, though other values are contemplated). In some aspects, when the flag 400 may be set to trusted (e.g., one, in some aspects) again. In some aspects, when a read operation is received, the "unknown" CSUMs (e.g., which are set to "unknown" value, e.g., "0xFF") from checksums 404 will not be taken into account. On subsequent write requests, checksums for changed blocks (as indicated in the checksum bitmap 402) will be recomputed and stored in the checksums structure 404 in memory 401, so that at least some blocks will have valid checksums.

In some aspects, when the mount command is received by the OS 107 and the checksum trust flag 400 is set to "1", a cache coherency algorithm is applied to checksums that are not in sync with the checksum calculated on the data in a corresponding block. Various coherency algorithms are contemplated herein, and may be predetermined by an administrator of the system.

In some aspects, the checksum module 110 may have one more components that run as background processes (e.g., daemons) that compute checksums for blocks of data whose corresponding checksum is invalid/unknown (e.g., "0xFF" in one aspect). In some aspects, the checksum module 110 may periodically write computed checksums to the archive 130. Alternatively, the checksum module 110 may store a list (in one aspect, a bitmap) on stable storage (e.g., the archive 130) so correct and outdated checksums can be identified. In exemplary aspects, the CSUM module 110 may trigger the checksum module 110 to perform such periodic operations. In exemplary aspects, when checksums in the archive 130 are not trusted, then the system 100 may re-compute all checksums for all blocks of the storage device 108. This may be performed in lazy mode, using a daemon component of the checksum module 110 that retrieves the data from blocks, calculates checksums for those blocks whose checksum in memory is unknown.

Figure 6:
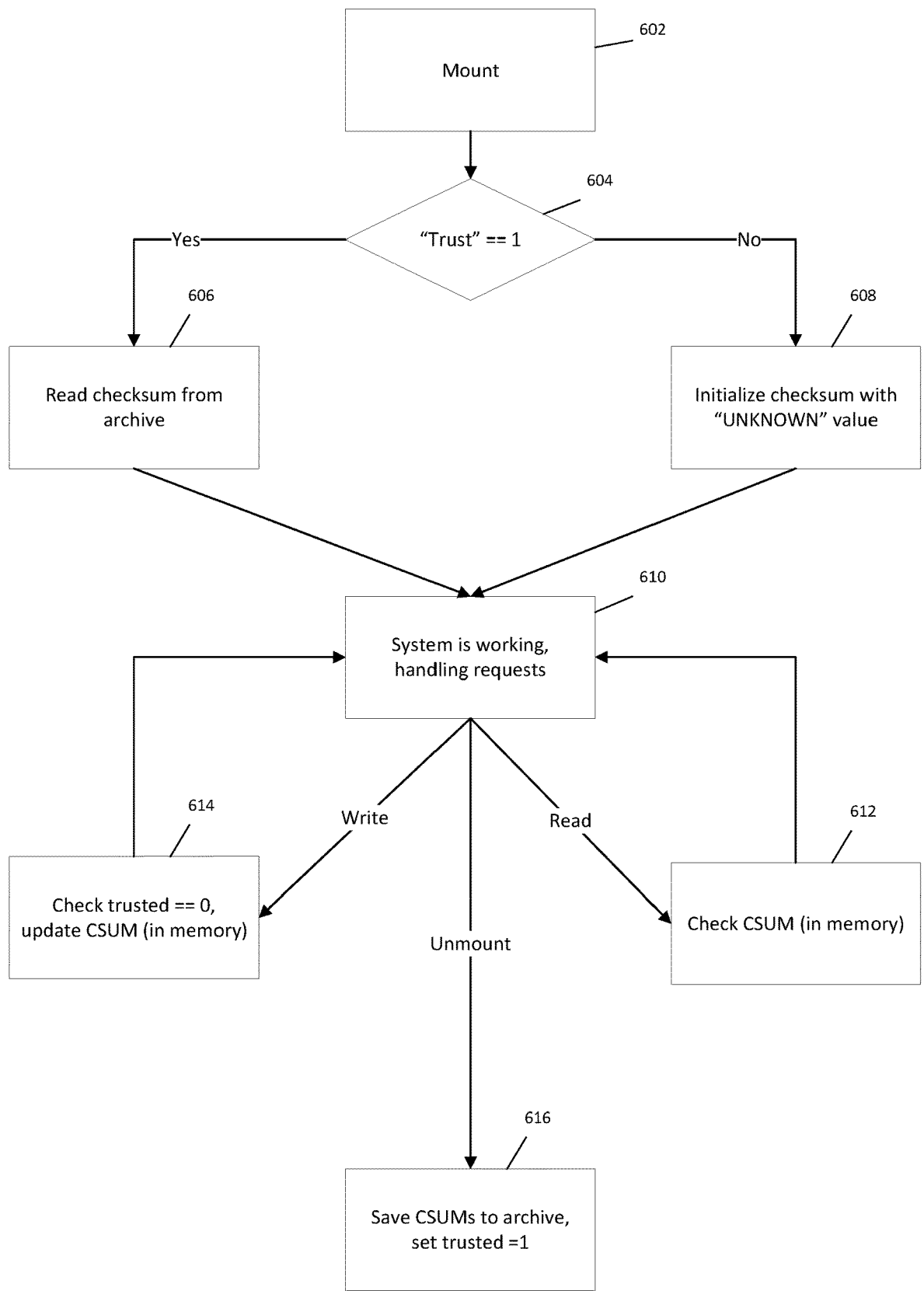
FIG. 6 is a flowchart summarizing the stages described in FIGS. 4-5 for maintaining data integrity in a storage device, in accordance with exemplary aspects of the present disclosure.

FIG. 6 is a flowchart summarizing the stages shown in FIGS. 4-5 for maintaining data integrity in a storage device, in accordance with exemplary aspects of the present disclosure.

Upon receiving the "mount" command at 602, the checksum module 110 starts to initialize the checksums in a data structure in memory (which is done in steps 604, 606 or 608). The file system or block device is mounted by the operating system. At 604, the checksum module 110 determines if a trust flag associated with the storage device being mounted is in a "trusted" state.

If the trust flag is set to "trusted" (e.g., 1 in some aspects), the checksum module 110 reads the checksums from archive (i.e., stable storage) at 606.

However, if the trust flag is set to "untrusted" (e.g., 0 in some aspects) indicating that the block device was left in an inconsistent state (e.g., after a crash, a power outage or the like), at 608 the checksum module 110 sets all checksums in memory to the unknown/invalid value (e.g., "0xFF" in some aspects).

At 610, the system is ready to receive and handle other requests: 10 requests (read/write) or unmount the block device.

If a "write" request is received, data is written to one or more blocks of the disk, and the checksum trust flag for the disk is set to "untrusted". The dirty bit corresponding to the one or more blocks in the checksum bitmap in memory are set to "dirty" (e.g., 1 in some aspects) and the checksums corresponding to the one or more blocks in the data structure are updated at 614. The update may be performed either synchronously or asynchronously.

If a "read" request is received, data is read from one or more blocks of the disk and the corresponding checksum is computed and compared to a checksum in memory corresponding to the one or more blocks at 612.

On "unmount" at 614, at least some of the checksums (e.g., those that have been changed after that they have been written to archive; also come CSUMs may be computed if needed) in the data structure are saved to an archive (e.g., checksum archive 130) and the checksum trust flag is set to "trusted".

Figure 7:
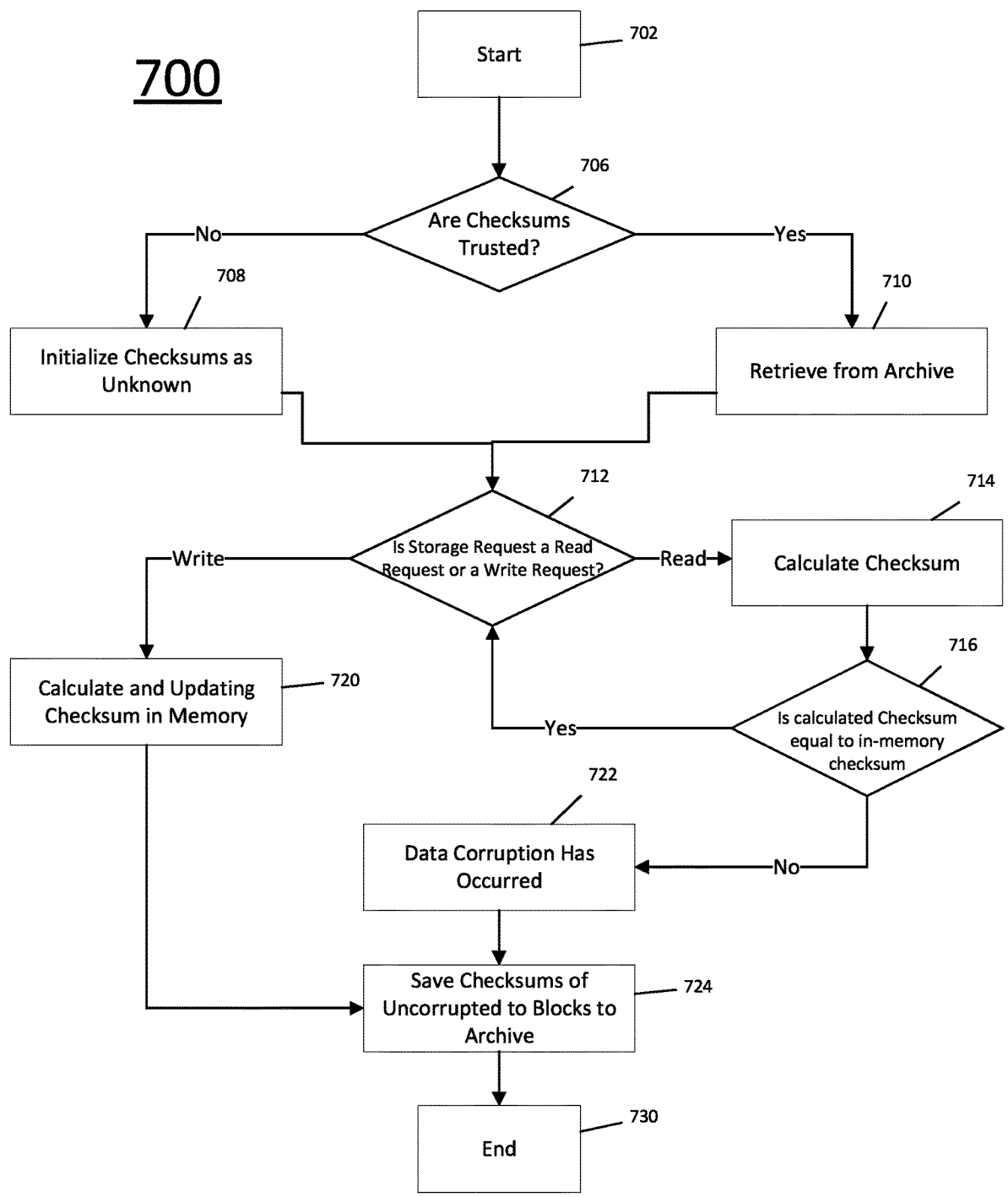
FIG. 7 is a flowchart illustrating another aspect of a method for maintaining data integrity in a storage device, in accordance with exemplary aspects of the present disclosure.

FIG. 7 is a flowchart illustrating another method 700 for maintaining data integrity in a storage device, in accordance with exemplary aspects of the present disclosure.

The method 700 starts at 702 and proceeds to 706, where the checksum module 110 determines whether checksums (e.g., CSUMS in archive) associated with data on a storage device mounted on a computer system are trusted or untrusted. In some aspects, this comprises checking a flag (e.g., trust flag) associated with the storage device (or with CSUM archive) to determine if it is set to a value indicating trusted, or untrusted.

If at 706, the checksums (e.g., CSUMs in archive) are untrusted, the method proceeds to 708 where the checksum module 110 initializes the checksums (e.g., in memory) as unknown/invalid. However, if the checksums in archive are trusted, the checksum module 110 retrieves the checksums from an archive at 710.

The method 700 then proceeds to 712, where the checksum module determines if a received/detected request is a read request or a write request for a data block of the storage device. If the request is a read request, the method proceeds to 714, where the checksum module 110 computes the checksum for the data in the data block. In some aspects, if an in-memory checksum associated with the identified block is not unknown, CSUM module calculates the checksum of the data in the identified block and comparing the checksum with an in-memory checksum associated with the identified block.

The checksum module 110 then determines whether the computed checksum is equal to the checksum stored in memory for the corresponding data block at 716. If the two are not equal, the method proceeds to 722, where it is determined that a data corruption has occurred. If the two are equal, the system proceeds as usual, waiting for further I/O requests at 712.

However, if at 712 a write request is received to write data into a block of the block device, the method proceeds to 720. At 720, the checksum module 110 calculates the checksums based on the data being written to the block. The checksum is updated in the data structure in memory.

Subsequently, after 720 and 722, the method proceeds to 724, where the checksums of uncorrupted blocks are saved to stable storage (e.g., checksum archive 130).

The method terminates at 730.

FIG. 8 is a block diagram illustrating a computer system 20 on which aspects of systems and methods for maintaining data integrity may be implemented in accordance with an exemplary aspect. It should be noted that the computer system 20 can correspond to the computer 102 for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated displays, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 8, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for maintaining data integrity of data in a storage device comprising:
   determining whether checksums stored in a checksum archive and associated with data on the storage device mounted on a computer system are trusted or untrusted, wherein the checksum archive is on a different storage device;
   responsive to determining that the checksums in the checksum archive are trusted, retrieving the checksums from the checksum archive, otherwise initializing the checksums as unknown;
   detecting a storage request for an identified block of the storage device;
   when the storage request is a write request, calculating a checksum of the data in the identified block and updating the checksum in memory of the computer system;
   when the storage request is a read request and an in-memory checksum associated with the identified block is not unknown, i) calculating the checksum of the data in the identified block and comparing the calculated checksum with an in-memory checksum associated with the identified block, and ii) determining that a data corruption has occurred when the calculated checksum does not match the in-memory checksum; and
   saving checksums associated with each of the data blocks of the storage device where the data corruption has not occurred to the checksum archive.

2. The method of claim 1, further comprising:
   wherein determining whether the checksums are trusted or untrusted comprises determining that the storage device was not turned off correctly;

detecting that there are checksums that are not trusted associated with blocks in the storage device; and setting the untrusted checksums as unknown.

3. The method of claim 1, further comprising:

calculating checksums for all blocks of the storage device using a background process for those checksums that are set as unknown.

4. The method of claim 1, further comprising:

managing a bitmap containing a status for each block of the storage device; and marking a status of a block as dirty if data stored in the block is changed during operation of the computer system; and calculating checksums for blocks with a dirty status; and storing the calculated checksums in memory of the computer system.

5. The method of claim 1, further comprising:

when the storage request is a write request, calculating the checksum of the data asynchronously, after the data is written to the block of the storage device;

saving the checksums to the checksum archive upon receiving an unmount request to unmount the storage device from the computer system.

6. The method of claim 1, further comprising:

storing the checksum in memory using write-through caching mode.

7. The method of claim 1, wherein the checksum archive is a separate block device with a file system stored thereon with indexing or a local or remote key-value store with non-indexed search, wherein indexing refers to storing checksums in a linear array and finding the checksums for a corresponding block using a block number of the block.

8. The method of claim 7, further comprising:

searching the local or remote key-value store using a non-indexed search comprising one of radix tree or hash table.

9. The method of claim 1, wherein determining whether checksums in a checksum archive associated with data on the storage device mounted on a computer system are trusted or untrusted further comprises:

checking a trust flag, wherein the trust flag is stored on one of:
 a file system mounted on the storage device;
 a block of the storage device; or
 the checksum archive.

10. The method of claim 1, wherein, when the storage request is a write request, calculating a checksum of the data in the identified block either synchronously or a synchronously.

11. A system for maintaining data integrity of data in a storage device comprising:

a hardware processor configured to:

determine whether checksums stored in a checksum archive and associated with data on the storage device mounted on a computer system are trusted or untrusted, wherein the checksum archive is on a different storage device;

responsive to determining that the checksums in the checksum archive are trusted, retrieve the checksums from the checksum archive, otherwise initializing the checksums as unknown;

detect a storage request for an identified block of the storage device;

when the storage request is a write request, calculate a checksum of the data in the identified block and updating the checksum in memory of the computer system;

when the storage request is a read request and an in-memory checksum associated with the identified block is not unknown, i) calculate the checksum of the data in the identified block and comparing the calculated checksum with an in-memory checksum associated with the identified block and ii) determine that a data corruption has occurred when the calculated checksum does not match the in-memory checksum; and save checksums associated with each of the data blocks of the storage device where the data corruption has not occurred to the checksum archive.

12. The system of claim 11, wherein determining whether the checksums are trusted or untrusted comprises determining that the storage device was not turned off correctly;

detecting that there are checksums that are not trusted associated with blocks in the storage device; and setting the untrusted checksums as unknown.

13. The system of claim 11, the hardware processor further configured to:

calculate checksums for all blocks of the storage device using a background process for those checksums that are set as unknown.

14. The system of claim 11, the hardware processor further configured to:

manage a bitmap containing a status for each block of the storage device; and mark a status of a block as dirty if data stored in the block is changed during operation of the computer system; and calculate checksums for blocks with a dirty status; and store the calculated checksums in memory of the computer system.

15. The system of claim 11, the hardware processor further configured to:

when the storage request is a write request, calculate the checksum of the data asynchronously, after the data is written to the block of the storage device;

save the checksums to the checksum archive upon receiving an unmount request to unmount the storage device from the computer system.

16. The system of claim 11, the hardware processor further configured to:

store the checksum in memory using write-through caching mode.

17. The system of claim 11, wherein the checksum archive is one of a separate block device with a file system stored thereon with indexing or a local or remote key-value store with non-indexed search, wherein indexing refers to storing checksums in a linear array and finding the checksums for a corresponding block using a block number of the block.

18. The system of claim 17, the hardware processor further configured to:

search the local or remote key-value store using a non-indexed search comprising one of radix tree or hash table.

19. The system of claim 11, wherein when the hardware processor determines whether checksums in a checksum archive associated with data on the storage device mounted on a computer system are trusted or untrusted, the hardware processor is further configured to:

check a trust flag, wherein the trust flag is stored on one of:
 a file system mounted on the storage device;
 a block of the storage device; or
 the checksum archive.

20. A non-transitory computer-readable medium, storing computer-executable instructions thereon for executing, on a computing system, a computer process for maintaining data integrity of data in a storage device, the computer process comprising:
- determining whether checksums stored in a checksum archive and associated with data on the storage device mounted on a computer system are trusted or untrusted, wherein the checksum archive is on a different storage device;
- responsive to determining that the checksums in the checksum archive are trusted, retrieving the checksums from the checksum archive, otherwise initializing the checksums as unknown;
- detecting a storage request for an identified block of the storage device;
- when the storage request is a write request, calculating a checksum of the data of the identified block and updating the checksum in memory of the computer system;
- when the storage request is a read request and an in-memory checksum associated with the identified block is not unknown, i) calculating the checksum of the data in the identified block and comparing the calculated checksum with an in-memory checksum associated with the identified block, and ii) determining that a data corruption has occurred when the calculated checksum does not match the in-memory checksum; and
- saving checksums associated with each of the data blocks of the storage device where the data corruption has not occurred to the checksum archive.

\* \* \* \* \*